United States Patent
Wakuda et al.

(12) 
(10) Patent No.: US 6,356,519 B1
(45) Date of Patent: Mar. 12, 2002

(54) DISK APPARATUS FOR MOVING HEAD TO CENTER OF TARGET TRACK IN SEEK OPERATION

(75) Inventors: Hiroshi Wakuda, Fukushima-ken; Akira Mitani, Kanagawa-ken, both of (JP)

(73) Assignees: Alps Electric Co., Ltd.; Sony Corporation, both of Tokyo (JP)

( * ) Notice: Subject to any disclaimer, the term of this patent is extended or adjusted under 35 U.S.C. 154(b) by 0 days.

(21) Appl. No.: 09/415,716

(22) Filed: Oct. 12, 1999

(30) Foreign Application Priority Data

Oct. 14, 1998 (JP) .............................. 10-292620

(51) Int. Cl.$^7$ ................................. G11B 7/00
(52) U.S. Cl. ................. 369/44.28; 369/44.29; 369/53.3
(58) Field of Search ................... 369/44.25, 44.27, 369/44.28, 44.29, 44.32, 44.34, 44.35, 44.36, 47.36, 47.38, 47.4, 47.44, 47.45, 47.39, 53.3, 53.12, 53.42, 53.43, 53.37, 124.02, 124.15

(56) References Cited

U.S. PATENT DOCUMENTS

5,048,002 A * 9/1991 Horie et al. ............. 369/44.35
5,299,083 A   3/1994 Kawada
5,652,743 A * 7/1997 Takamine et al. .... 369/44.34 X

* cited by examiner

*Primary Examiner*—Paul W. Huber
(74) *Attorney, Agent, or Firm*—Brinks Hofer Gilson & Lione

(57) ABSTRACT

In a seek operation, in which a head is moved to a target track, the detection output of a head-position detection unit is integrated in each track. Each integrated value is a positive or negative value proportional to an offset given to a center value obtained from the maximal value and the minimal value of the detection output. The center value is compensated for by a compensation value obtained by multiplying the integrated value by a coefficient. As a result, the offset is reduced and a highly precise positional detection is allowed.

6 Claims, 6 Drawing Sheets

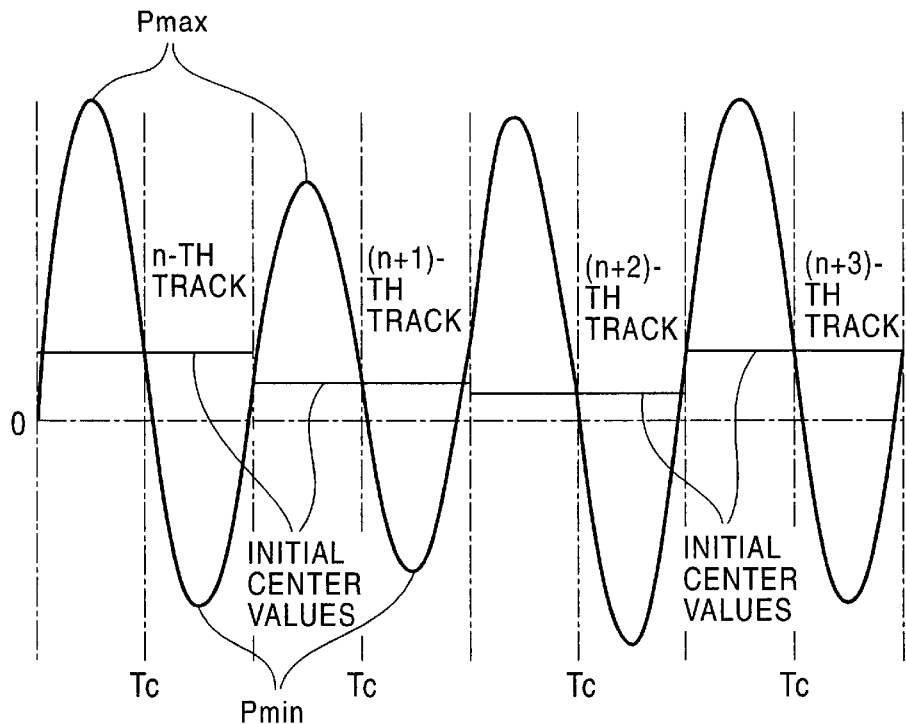
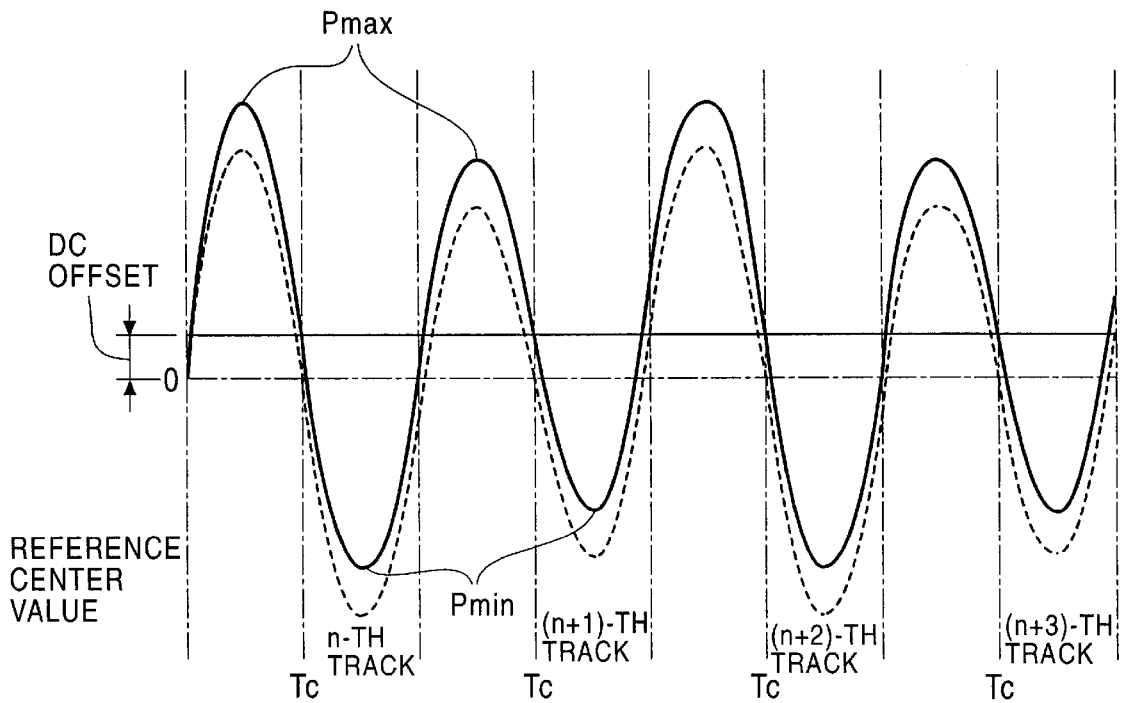

DISK APPARATUS FOR MOVING HEAD TO CENTER OF TARGET TRACK IN SEEK OPERATION

BACKGROUND OF THE INVENTION

1. Field of the Invention

The present invention relates to disk apparatuses for controlling a head such that the head seeks information at the center of the target track on a disk, such as a floppy disk (FD), during a reproduction operation.

2. Description of the Related Art

In a conventional floppy-disk drive apparatus, a step driving mechanism employing a stepper motor is used as a head feed unit for moving a head to a track where recording is to be performed concentrically on a recording plane of a disk. With a mechanical step operation of this head feed unit, the head is positioned at the track. Instead of the step driving mechanism, a head feed unit having a linear-motor (voice-coil motor: VCM) drive is provided for some floppy-disk drive apparatuses to move the head continuously.

In a disk apparatus of such a type, a head-position detection unit detects a return of the head to the origin and reports it to the host computer. To move the head to the target track of a disk, the host computer sends seek instruction-pulses, one for one track, to the disk apparatus. According to this seek instruction pulses, the disk apparatus moves the head by the number of tracks corresponding to the seek instruction pulses.

In apparatuses such as the conventional floppy-disk drive apparatus, a screw shaft driven by a stepper motor is engaged with a head base and the head is fed by the rotation of the screw shaft. Since the mechanical connection determines the relationship between the rotation of the stepper motor and the movement position of the head, the head is moved to the target track just by driving the stepper motor according to the seek instruction pulses sent from the host computer.

On the other hand, in apparatuses employing a head feed unit having a linear-motor drive, since a head base has movement flexibility in the head feed unit, a head-position detection unit for always detecting the movement position of the head and a head-position control unit using the detection output thereof need to be provided.

Such a head feed unit having a linear-motor drive is, for example, included in a disk apparatus in which a high-density-recording disk on which a servo signal is recorded for tracking and a floppy disk (FD) having a capacity of 2 megabytes (MB) can be loaded. The high-density disk to be loaded into this type of a disk apparatus is also a flexible disk. In the following description, a flexible disk having a capacity of 2 MB is called a floppy disk and it is discriminated from the high-density disk.

When the high-density disk is loaded, the head is moved by a linear-motor drive. The head reads the servo signal and is positioned at a track. On the other hand, when a floppy disk is loaded, the head feed position is controlled according to the detection output of the head-position detection unit and the head is positioned at the track.

In the head-position detection unit, a linear scale having slits at a constant interval is provided for either the head base or a chassis, and a light source and a light-receiving device opposite each other through the slits are provided for the other part. According to the movement of the head, a detection output in which the polarity of the output strength is periodically changed is obtained from the light-receiving device.

For example, detection outputs having two different phases are obtained. The head-position detection unit is mounted such that the head is positioned on the center of a track recorded in the disk at the center point of the maximal value and the minimal value of a detection output.

The detection outputs corresponding to each track are measured and stored as sets of the maximal values and the minimal values in a calibration operation at a drive start. Alternatively, they are measured and stored in advance in a shipment process of the disk apparatus. When track tracking control is performed in which the head tracks the target track, the center values (hereinafter called reference center values) of the maximal values and the minimal values of the detection outputs corresponding to the target track are obtained and the VCM is driven such that the detection output signals have the reference center values. Tracking control for the target track is performed in this way.

The detection outputs of the head-position detection unit may vary due to external causes such as the variations of the surrounding temperature and of the power voltage of the disk apparatus. In other words, the detection outputs vary due to DC offsets applied to the detection outputs.

If such a DC offset occurs, the center value of the maximal value and the minimal value of a detection output is shifted from the reference center value, and as a result, the target position in the track tracking control is shifted from the actual track center.

When a disk is loaded, if the calibration operation is executed, even if the detection outputs of the head-position detection unit vary, sets of the maximal values and the minimal values of the newly detected detection outputs corresponding to each track can be used to eliminate the generated variations of the detection outputs.

In the interface corresponding to the conventional floppy disk, however, when the host computer sends a recording/reproduction request command, since it is necessary to immediately execute this command, it is undesirable that a calibration operation is performed, for example, when a disk is loaded after the disk apparatus is started. Therefore, variations of the detection outputs generated after a calibration is performed at the start substantially cannot be eliminated.

SUMMARY OF THE INVENTION

The present invention has been made to solve the foregoing drawback. Accordingly, it is an object of the present invention to provide a disk apparatus which allows the variations of the detection outputs of a head-position detection unit, caused by a change of the surrounding condition or for some reason, to be compensated for.

The foregoing object of the present invention is achieved through the provision of a disk apparatus including: a rotation driving section for rotating a disk; a head facing a recording surface of the disk; head feeding means for feeding the head in a direction in which the head traverses tracks on the disk; head-position detection means for obtaining a detection output whose signal strength has a polarity periodically changed according to the movement of the head; and a control section for controlling the head feeding means according to the detection output obtained by the head-position detection means, wherein the control section calculates an offset between a reference center value specified in advance and the center value of the maximal value and the minimal value of the detection output detected when a seek operation, in which the head is moved to a target track, is performed; calculates a compensation value to reduce or eliminate the offset; and applies compensation control to the reference center value according to the compensation value.

The disk apparatus may be configured such that the detection output in the seek operation is integrated in time with the reference center value being used as a reference, and the obtained integrated value is multiplied by a coefficient to obtain the compensation value.

The reference center value may be compensated for according to an offset between the reference center value and the center value obtained from the maximum value and the minimal value of the detection output, detected in the seek operation, preferably, the center value obtained from the averages of the detected maximal values and the detected minimal values for a plurality of waveforms.

The reference center value may be specified for each track or for each set of a plurality of tracks which can be all tracks.

It is preferred that the disk apparatus be configured such that the calculation is performed for each track or each set of a plurality of tracks and the coefficient is specified so that the offset is reduced at a predetermined rate when the head traverses a predetermined number of tracks.

When the offset is gradually compensated for in this way, if noise is mixed at a detection or a signal having an offset extremely increasing temporarily is generated, for example, the compensation value receives a reduced effect and its reliability is improved.

The disk apparatus may be configured such that the center value is obtained for each track or for each set of a plurality of tracks which can be all tracks, from the maximal value and the minimal value of the detection output corresponding to each track, detected when the head is moved at a lower speed than that in the seek operation, the center value is stored as the reference center value, and the compensation is applied to the reference center value. The set of the maximal value and the minimal value of the detection output may be that of the maximal value and the minimal value obtained for a set of a plurality of tracks.

The reference center value may be specified when the disk apparatus is manufactured, or when the user stops using the apparatus. The reference center value may be specified by the use of the integrated value, as described above.

The control section may perform track tracking control such that the reference center value corresponds to the center of the target track.

As described above, according to the present invention, when the head position is controlled by using an output of the head-position detection unit, the variation of the center value of the detection output of the head-position detection unit is compensated for and a highly precise head-position detection is allowed.

BRIEF DESCRIPTION OF THE DRAWINGS

FIG. 2A is a side view of the linear scale, and FIG. 2B is a partial plan showing the relationship between the optical detector and the linear scale.

FIG. 5 is a waveform view used for describing how reference center values are specified for a detection output of the head-position detection unit.

FIG. 6 is a waveform view used for describing how the center value of the detection output of the head-position detection unit is compensated for.

DESCRIPTION OF THE PREFERRED EMBODIMENT

Figure 1:
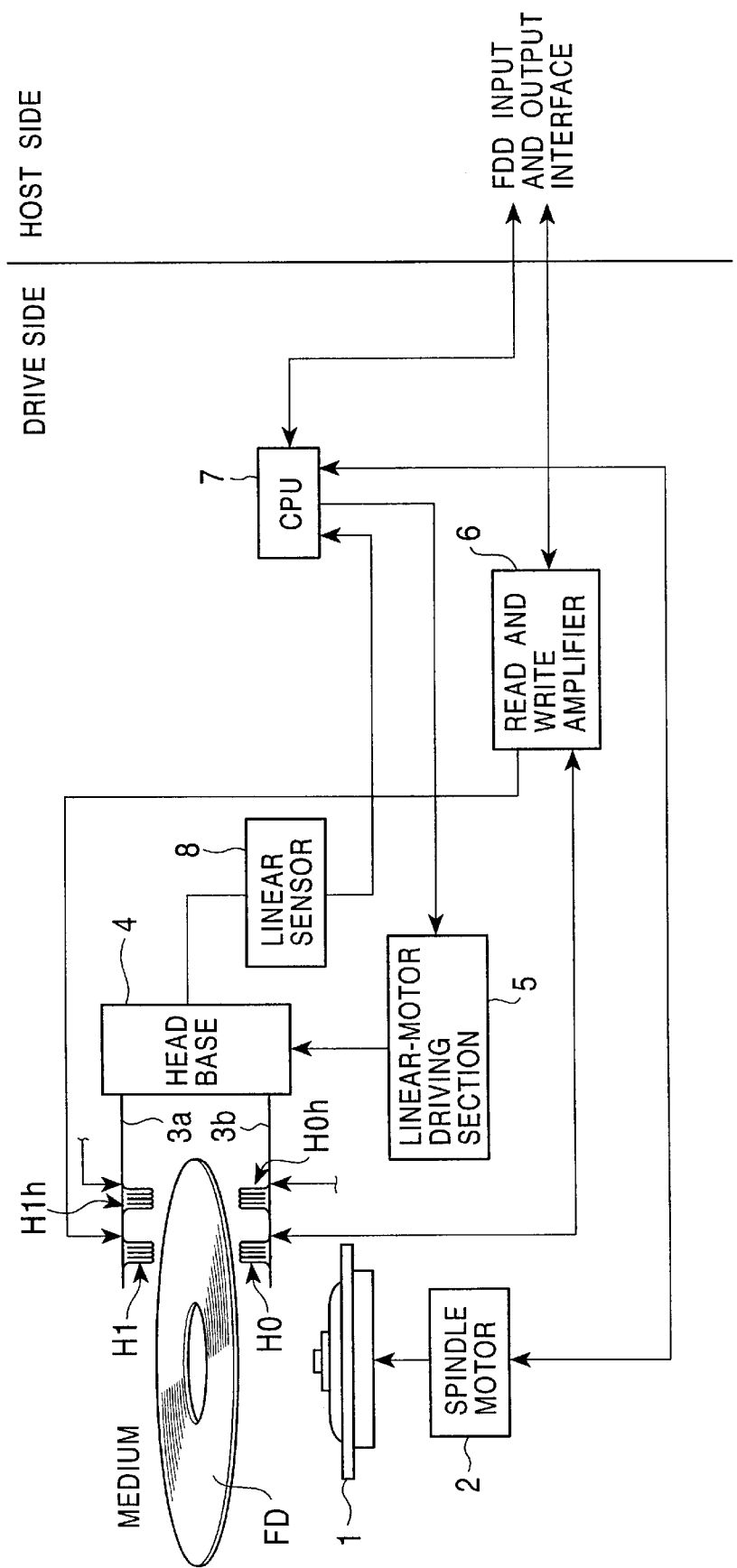
FIG. 1 is a block diagram of a disk apparatus according to the present invention.

FIG. 1 is a block diagram of a disk apparatus according to the present invention.

The disk apparatus can load a high-density-recording disk and a floppy disk (FD) having a capacity of 2 megabytes (MB) and conforming to the same standard as a conventional disk.

The disk apparatus includes a turntable on which the center section of each of the above disks is loaded, that is, a rotation driving section 1. The rotation driving section 1 is rotated by a spindle motor 2. When a floppy disk (FD) is loaded on the rotation driving section 1, a magnetic head H0 at a side 0 contacts one recording surface of the disk and a magnetic head H1 at a side 1 contacts the other recording surface.

The magnetic head H1 is supported by a support arm 3a, and the magnetic head H0 is supported by a support arm 3b. Both support arms 3a and 3b are supported by a head base 4. The head base 4 can be continuously fed in the radial direction of the disk D by a head feeding unit having a linear-motor driving section (VCM) 5.

The magnetic heads H0 and H1 are connected to an FDD input and output interface through a read and write amplifier 6. The host computer sends a control signal for controlling the floppy-disk drive to the input and output interface.

When data is recorded into or reproduced from the floppy disk (FD), the movement of the head base 4 is detected by a linear sensor 8 serving as a head-position detection unit, and the detection output is sent to a CPU 7 serving as a control section. The CPU 7 controls the linear-motor driving section 5 and the spindle motor 2.

The support arms 3a and 3b also have other magnetic heads H0*h* and H1*h* used for a high-density-recording magnetic disk. When a high-density-recording disk is loaded on the rotation driving section 1, recording and reproduction are performed with the use of the magnetic heads H0h and H1h.

In the high-density-recording disk, a servo signal for tracking is recorded on a recording surface. The CPU 7 detects the servo signal according to the reproduction outputs of the magnetic heads H0*h* and H1*h*, controls the linear-motor driving section 5 by the use of this servo signal, and performs a head seek operation and on-track control. Therefore, when a high-density-recording disk is loaded, the output of the linear sensor 8 is not used for seek control. An input and output interface (not shown) used for recording and reproduction operations of a high-density-recording disk is provided separately from the FDD input and output interface shown in FIG. 1.

Figure 2A:
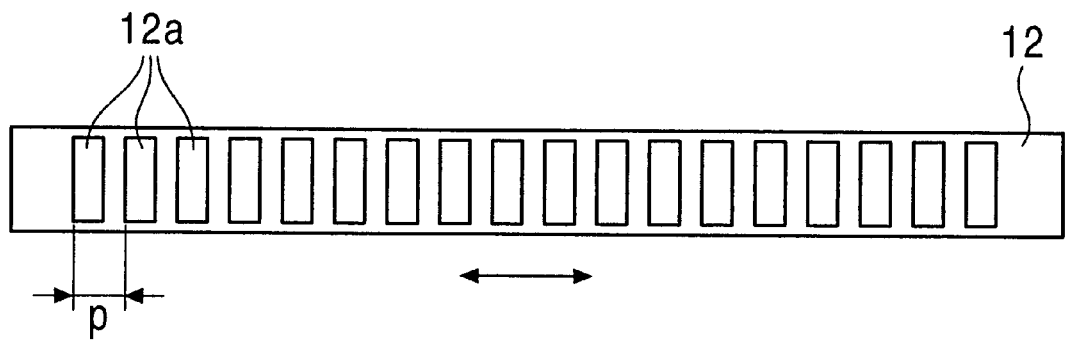
FIGS. 2A and 2B show an example structure of a head-position detection unit formed of a linear scale and an optical detector.
Figure 2B:
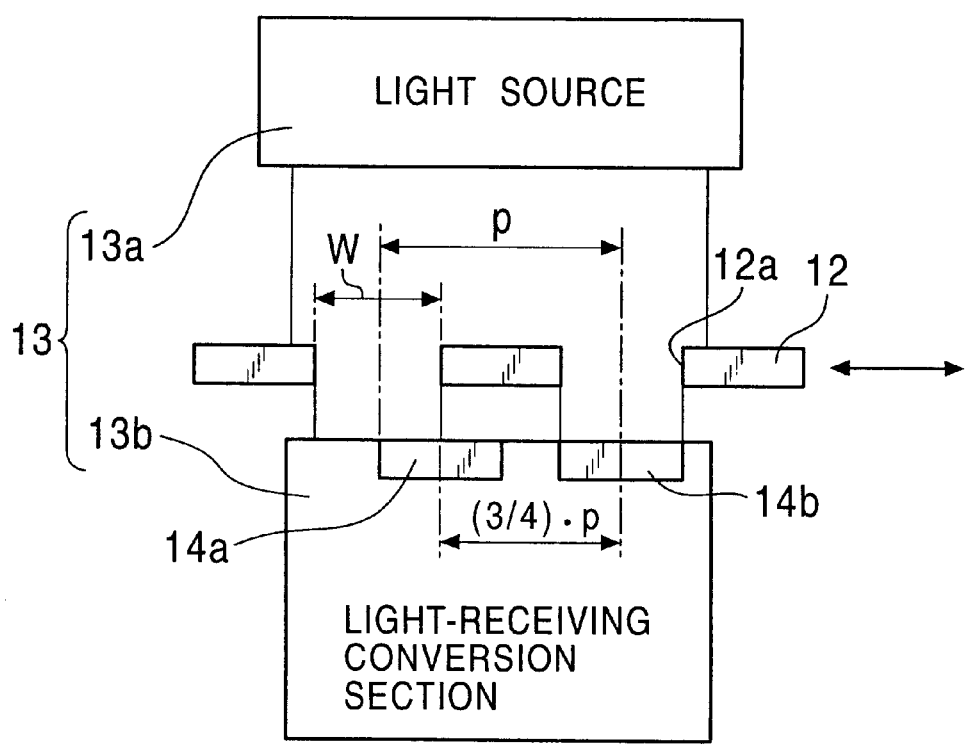

The head-position detection unit for detecting the position of heads when the floppy disk (FD) is loaded, namely, the linear sensor 8, is formed of a linear scale 12 and an optical detector 13 as shown in FIGS. 2A and 2B. Either the linear scale 12 or the optical detector 13 is secured to the head base 4, and the other is secured to a chassis.

The linear scale 12 is formed of a narrow plate for which a plurality of detection windows (slits) 12a are provided at a constant interval. The optical detector 13 is formed of a light source 13a and a light-receiving conversion section 13b fixed opposite to each other with the linear scale 12 sandwiched therebetween. The light-receiving conversion section 13b is provided with a light-receiving device 14a and a light-receiving device 14b. The light-receiving device 14a and the light-receiving device 14b are disposed at a distance of 3p/4, where p indicates the interval of the detection windows 12a made in the linear scale 12.

Light emitted from the light source 13a passes through the detection windows 12a formed in the linear scale 12 and is detected by the light-receiving devices 14a and 14b. Since the linear scale 12 and the optical detector 13 move relatively, two-phase detection outputs having strengths which change like trigonometric functions or those approximating to trigonometric functions are obtained from the light-receiving devices 14a and 14b. Due to the interval "p" of the detection windows 12a in the linear scale 12, the light-receiving output obtained from the light-receiving device 14a and that obtained from the light-receiving device 14b have a phase difference of one-fourth the period (90 degrees).

A third detection unit for detecting the position of the head base when the magnetic heads H0 and H1 are positioned on the most outer track (track number: 0) of the disk is provided, although it is not shown in the figure.

When the floppy disk (FD) is loaded into this disk apparatus, the host computer performs through the FDD input and output interface the same control as for a conventional floppy-disk drive apparatus. Specifically, when the third detection unit moves the magnetic heads H0 and H1 to the most outer track (track number: 0), the CPU 7 recognizes the condition and reports it to the host computer. In seek control, the host computer sends seek instruction pulses, one pulse for one track, to the CPU 7 of the disk apparatus.

The operation of the linear sensor 8, which serves as the head-position detection unit, will be described below.

Figure 3A:
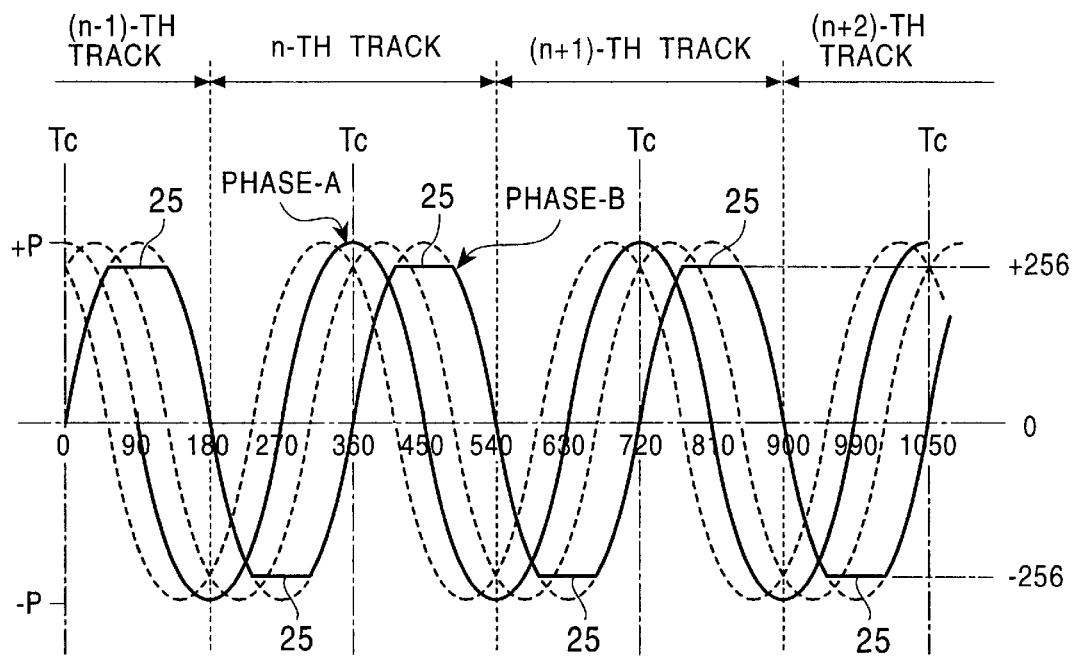
FIG. 3A is a view of the waveforms of phase-A and phase-B detection outputs.
Figure 4:
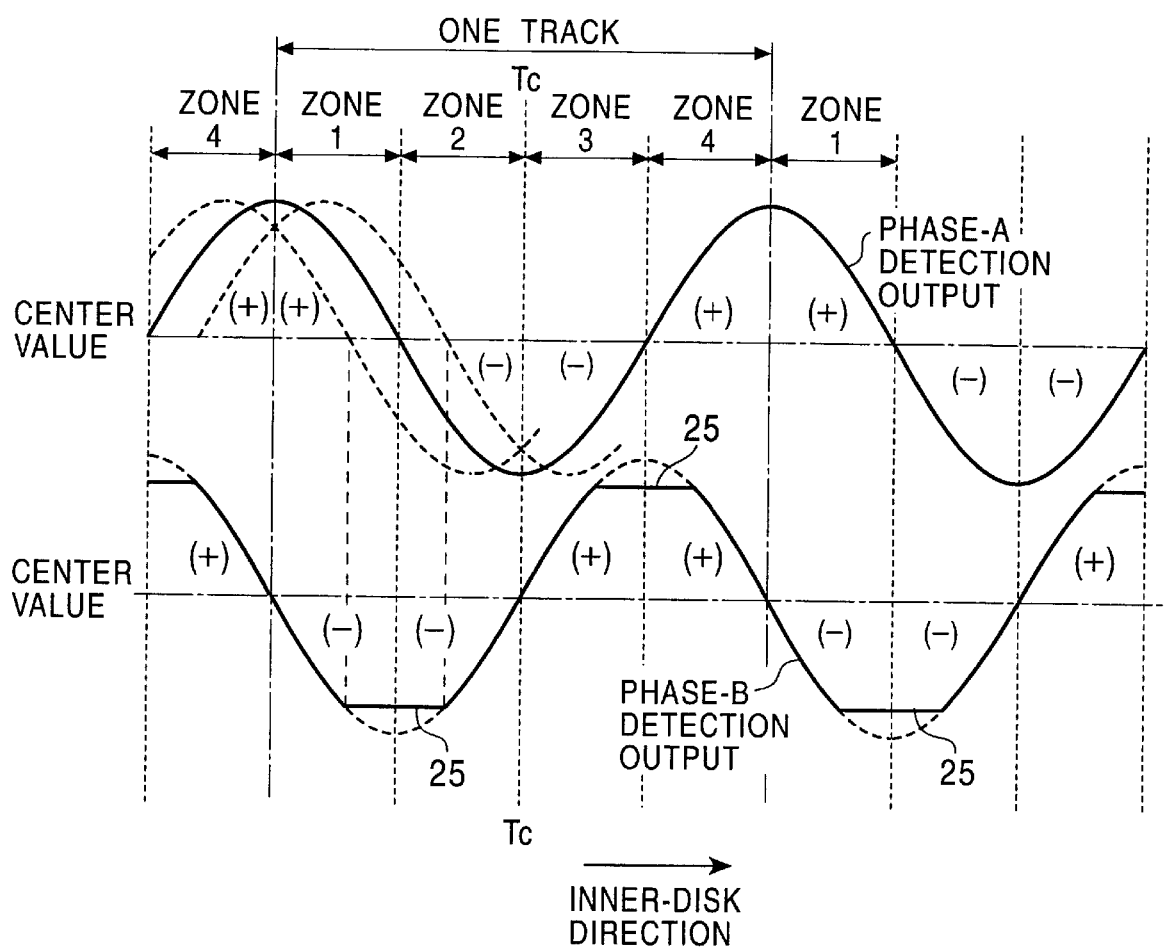
FIG. 4 is a waveform view extended in the time domain of FIG. 3A.

FIG. 3A shows the detection output of the linear sensor 8 obtained when the magnetic heads H0 and H1 are moved in a track transverse direction of the disk. FIG. 4 is a view of a part shown in FIG. 3A, extended in the horizontal direction.

The detection output obtained when the light-receiving device 14a of the light-receiving conversion section 13b receives light is called a phase-A detection output, and the detection output obtained when the light-receiving device 14b receives light is called a phase-B detection output. The horizontal axes of FIG. 3A and FIG. 4 mean the radial direction of the disk and correspond to the phase of the phase-B detection output. The phase-A detection output has a phase difference of one-fourth the period (90 degrees) against the phase-B detection output as a design value. The vertical axes indicate the strength (voltages converted by photoelectric conversion) of the detection outputs. The peaks of the detection output of each phase are indicated by Pmax and Pmin.

The phase-B detection output has a center value (0-V point) at phases of 0 degrees, 180 degrees, 360 degrees, 540 degrees, 720 degrees, . . . . The mount position of the linear sensor 8 is adjusted such that the magnetic heads H0 and H1 match the center Tc of each track on the disk when the phase is equal to 360 degrees multiplied by N (N being an integer). The period (360 degrees) of the phase-B detection output corresponds to one track pitch (1 TK equals 187.5 µm, for example). The area within 180 degrees in both directions from the track center Tc corresponds to one track. In the following description, the track center Tc of the n-th track is set to the center of the target track in a seek operation for the sake of convenience.

In FIG. 3A and FIG. 4, a solid line indicates a phase-A detection output obtained as designed, namely, the phase-A detection output having an accurate phase difference of 90 degrees against the phase-B detection output, and dotted lines indicate the range of phase-A detection outputs having an expected tolerance against the designed value before and after the solid line. This tolerance is generated by a machining error of the linear scale 12 or an error of the relative mount positions of the light-receiving device 14a and the light-receiving device 14b. In FIG. 3A and FIG. 4, the tolerance of the phase difference between the phase-A and phase-B detection outputs is set to ±30 degrees.

To detect the current head position and a positional deviation from the current head position to the center of the target track, a combination of the polarity of the phase-A detection output and that of the phase-B detection output is calculated. From the calculated value, the zone in a track, where the heads are positioned is detected. According to the phase-B detection output, the positional deviation from the current head position to the track center Tc in the track is detected.

FIG. 4 shows the polarity of the phase-A detection output and that of the phase-B detection output. Since the phase-A detection output and the phase-B detection output change as trigonometric functions or in manners similar to those, the polarity of each detection output changes in every 180 degrees (half the period).

Therefore, the combination of the polarity of the phase-A detection output and that of the phase-B detection output changes in four ways in one track. When the polarity of the phase-B detection output is negative (−) and that of the phase-A detection output is positive (+), the corresponding zone in a track is called a zone 1, when both polarities of the phase-B and phase-A detection outputs are negative (−), the corresponding zone is called a zone 2, when the polarity of the phase-B detection output is positive (+) and that of the phase-A detection output is negative (−), the corresponding zone is called a zone 3, and when both polarities of the phase-B and phase-A detection outputs are positive (+), the corresponding zone is called a zone 4.

The CPU 7 calculates the combination of the polarities, determines that the magnetic heads have been moved to an adjacent track when the CPU 7 recognizes that the magnetic heads have been moved from the zone 4 to the zone 1, and a track counter is incremented by 1. When the CPU 7 recognizes that the magnetic heads have been moved from the zone 1 to the zone 4, the track counter is decremented by 1. The track counter is included in the CPU 7.

The positional deviation from the current head position to the center of the target track is next obtained from the current track number indicated by the track counter and the phase-B detection output. This calculation is performed in three different ways according to the zone where the heads are positioned.

A method for calculating the positional deviation from the current position of the magnetic heads to the center of the target track will be described below for each zone.
Calculation in the zone 1:

Positional deviation=−{(target-track number−current-track number)·TK+0.5TK}·Kt−(phase-B detection output−phase-B center value)·Ks, where TK indicates the distance corresponding to one track pitch, and Kt and Ks indicate coefficients.

Calculation in the zone 2 and the zone 3:

Positional deviation=−(target-track number−current-track number)·TK·Kt+(phase-B detection output−phase-B center value)·Ks.

Calculation in the zone 4:

Positional deviation=−{(target-track number−current-track number)·TK−0.5TK}·Kt−(phase-B detection output−phase-B center value)·Ks.

In each of the zone 1 and the zone 4, a compensation of 0.5 TK is applied to the first term of the calculation expression. This is because, in the zone 1, when the heads approach the center of the track, the positional deviation increases in the negative side as if the heads left away from the center of the track; and in the zone 4, when the heads leave away from the center of the track, the positional deviation decreases in the positive side as if the heads approached the center of the track. To compensate for these points, 0.5 TK is added and subtracted.

The coefficients Kt and Ks will be described next.

The coefficient Kt is set such that the movement distance (187.5 $\mu$m) in one track corresponds to a resolution of 1024 steps. In other words, the CPU recognizes that the heads are distant from the center of the target track in the disk outer direction by 187.5 $\mu$m when the calculated positional deviation becomes −1024 (see FIG. 3B)

In the present embodiment, it is considered that the phase difference (90 degrees) between the phase-A and phase-B detection outputs may have an error of ±30 degrees, and therefore, the coefficient Ks is determined such that (Pmax−Pmin)×cos(60 degrees) corresponds to a resolution of 512.

As a result, when it is assumed that the phase-A detection output has a phase error of ±30 degrees, as shown in FIG. 3A and FIG. 4, the phase-B detection output is fixed to a +256 step or a −256 step correspondingly to the range of ±30 degrees. In other words, within the range where the phase-A detection output may have a phase error, restriction is applied to the phase-B detection output such that the output has a fixed value of the +256 step or the −256 step. A dead zone 25 indicates the phase-B detection output corresponding to the phase-error range of ±30 degrees.

Figure 3B:
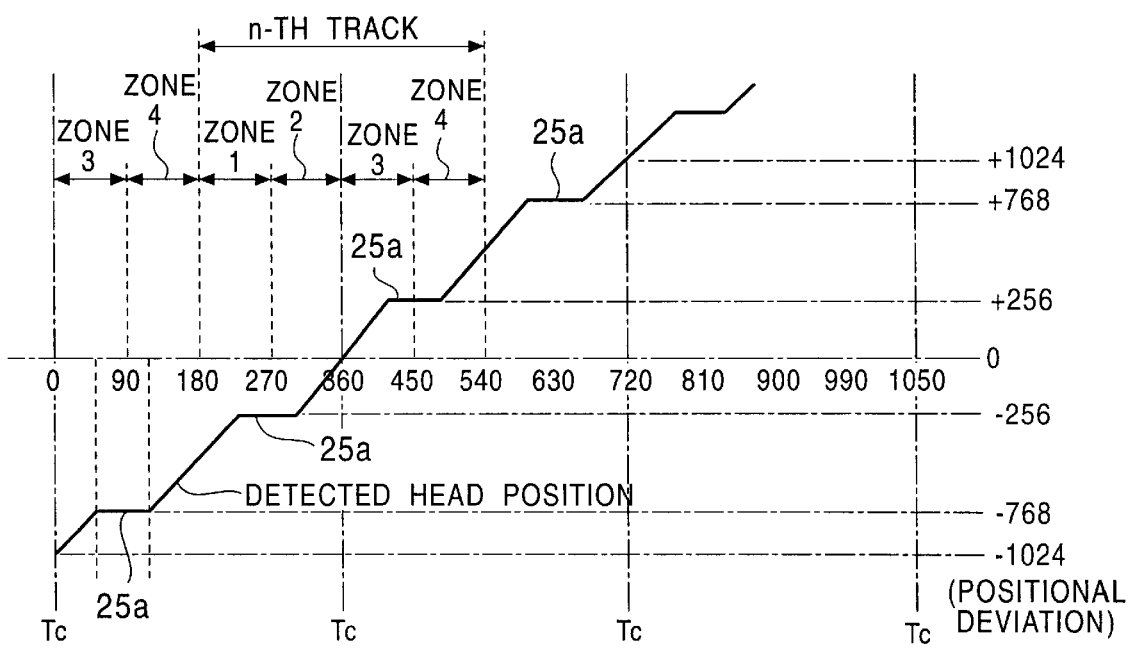
FIG. 3B is a view of the waveform of the calculated positional deviation of a head.

Therefore, as shown in FIG. 3B, the calculation result of the positional deviation in each of the zone 1 to the zone 4 includes zones 25a where the calculated values are constant irrespective of the position of the heads.

When the phase-B detection output has the dead zones 25, corresponding to the phase error of ±30 degrees, as shown in FIG. 3A and FIG. 4, even if the phase-A detection output has a phase error of +30 degrees and thereby the boundary between the zone 1 and the zone 2 and the boundary between the zone 3 and the zone 4 are changed, since calculated values are limited to ±256, the CPU 7 determines that the heads have not been moved in the zones 25a where a constant value is obtained and controls such that the heads are moved in the original movement direction while the constant value is obtained. Therefore, even if the phase-A detection output has a phase error, the heads are positively moved to the target track.

(Specifying the reference center value of the detection outputs)

FIG. 5 shows the waveform of one of the detection outputs from the linear sensor 8, which serves as the head-position detection unit. This detection output is compensated for such that it shows a trigonometric wave. This wave is not necessarily uniform, as shown in FIG. 5. Due to the tolerances of the dimensions of the detection windows 12a in the linear scale 12 or for some reason, the maximal values Pmax and the minimal values Pmin vary for tracks, and as a result, Pmax and Pmin vary.

Therefore, it is preferred that Pmax and Pmin corresponding to each track be measured and stored in the CPU 7 and the head position be detected with (Pmax+Pmin)/2 in each track being set to the reference center value. The center value may be measured in each track, stored in the CPU 7, and used. The reference center value, Pmax, and Pmin are measured and stored in a calibration operation to be performed when the user starts the disk apparatus. The reference center value, Pmax, and Pmin may be measured and stored in an inspection process after the disk apparatus has been manufactured, or in a period when the user stops using the apparatus.

To set the reference center value, the linear-motor driving section 5 feeds the head base 4 at a constant speed lower than a seek speed used when a disk is loaded. When the head base 4 is moved at the constant speed, a periodical detection output is obtained from the linear sensor 8, as shown in FIG. 5. The maximal value and the minimal value are detected in each track. A calculation of (Pmax+Pmin)/2 is performed for each track (n-th track, (n+1)-th track, (n+2)-th track, (n+3)-th track, . . . ) as shown in FIG. 5, and the calculated value is used as the reference center value.

In the head-position detection control shown in FIGS. 3A, 3B, and 4, when the phase-B detection output has the reference center value at an interval of 360 degrees, it is determined that the head is positioned at a track center. When the reference center value is set for the phase-A detection output, the polarity of the phase-A detection output shown in FIG. 4 is obtained against the reference center value.

The Pmax and Pmin values are measured separately in each track and stored. A calculation of (Pmax+Pmin)/2 is separately executed for each track to obtain the reference center value. The reference center value is obtained for each track from the Pmax and Pmin values measured for each track and the obtained value may be stored in the CPU 7. A center value obtained from Pmax and Pmin detected in a block of several tracks may be used as the reference center value of the block. The apparatus may be configured such that the average of Pmax values and that of Pmin values detected in a block of several tracks are stored in the CPU 7 as Pmax and Pmin of the block, and the calculation is performed with the use of the averages to obtain the reference center value. The reference center value may be obtained by a calculation using an integrated value, described below. (Compensation to be applied to the reference center value)

When a disk apparatus for which a reference center value is specified as described above is used, a DC offset may be given to the center value of the detection output of the linear sensor 8, which serves as the head-position detection unit, due to a variation of the detection level of the optical detector or a variation of the power voltage, caused by a change in the surrounding conditions. In FIG. 6, a dotted line indicates an output waveform obtained when the reference center value is specified, and a solid line indicates a condition in which the waveform is shifted due to a DC offset. A compensation operation for eliminating or reducing such a DC offset is performed in a seek operation performed in recording or reproduction.

Figure 7:
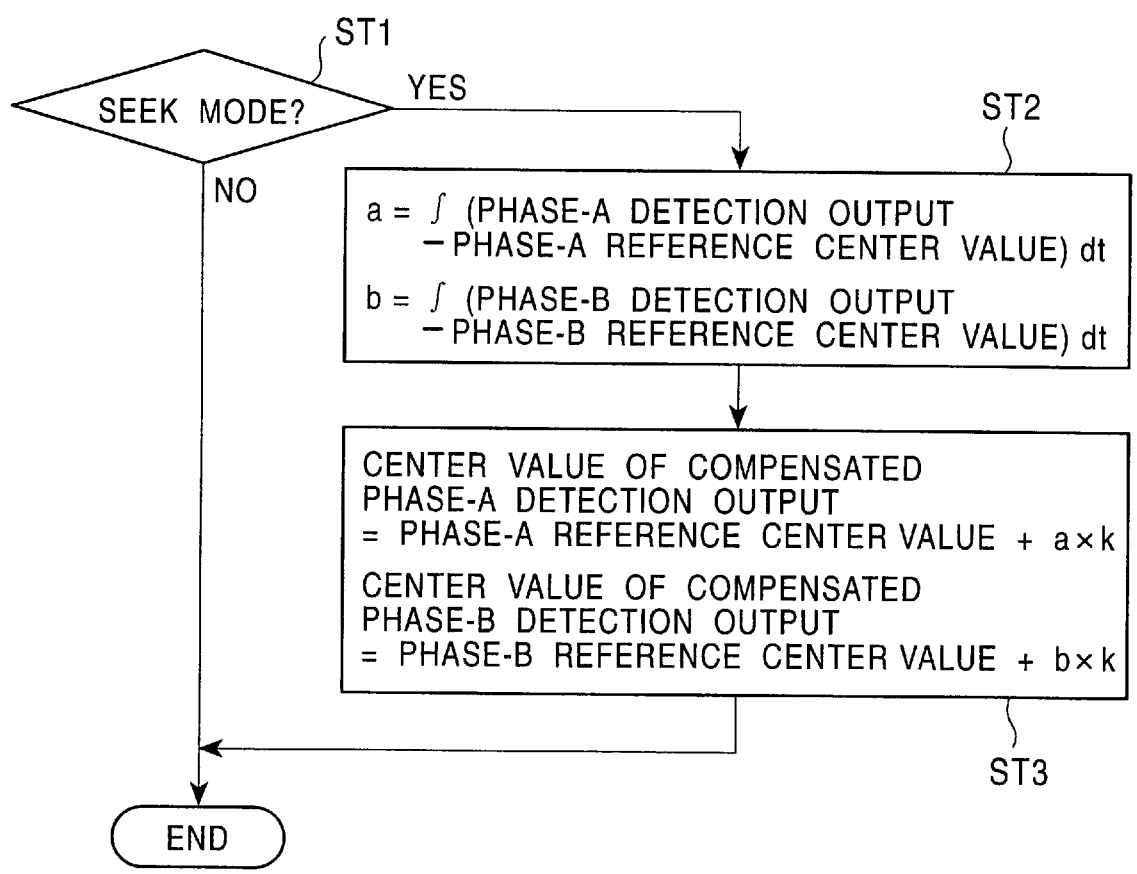
FIG. 7 is a flowchart of a compensation operation applied to the center value of the detection output.

FIG. 7 is a flowchart of the compensation operation. As shown in a step 1 (ST 1) in FIG. 7, this compensation operation is always executed when a seek operation is performed. In a seek operation, the detection outputs are obtained from the linear sensor 8. In a step 2 (ST 2), immediately after the seek operation is started and the detection outputs are obtained, the level difference between the phase-A detection output and the phase-A reference center value is integrated in time to obtain an integrated value "a" in each track. In the same way, the level difference between the phase-B detection output and the phase-B reference center value is integrated in time to obtain an integrated value "b" in each track.

When the DC offset is positive against the reference center value, the integrated values "a" and "b" in each track are positive as indicated by area ratios in FIG. 6. When the DC offset is negative against the reference center value, the integrated values "a" and "b" in each track are negative. The integrated values "a" and "b" may be obtained in a predetermined number of a plurality of tracks while the heads are moved in the seek operation, instead of in each track. They may be obtained for all tracks which the heads are moved through in the seek operation. These integrated values are proportional to the DC offset. With the use of the integrated values and the reference center values, even if an offset is generated, one of the reference center values can be obtained at a track center.

The reference center values specified in each track are compensated for by the use of the integrated values during a seek operation. A step 3 (ST 3) shows a calculation for the compensation. The reference center value obtained after the phase-A detection output is compensated for is (phase-A reference center value +a×k), and the reference center value obtained after the phase-B detection output is compensated for is (phase-B reference center value+b×k). A compensation coefficient is indicated by "k" and is used as a compensation gain by the CPU 7 in the compensation. The coefficient "k" is multiplied by the integrated values "a" and "b" to obtain compensation values. With the compensated new reference center values, track tracking control is performed such that the heads are not shifted from a track center.

The compensation gain (coefficient) "k" is set, for example, such that a generated DC offset is reduced about 70% or 80% in a seek operation for 100 tracks. When the compensation gain (coefficient) "k" is set large, the number of movement tracks required to cancel (eliminate) the generated DC offset is reduced. If the coefficient "k" is set larger than necessary, however, the detection outputs of the linear sensor 8 are susceptible to a waveform deformation and noise. Therefore, the coefficient "k", namely, the compensation gain, is set such that the detection outputs are not susceptible to a waveform deformation and the DC offset is eliminated as soon as possible.

The calculation for the compensation by the use of the coefficient "k" may be always performed for all tracks during a head seek operation. To reduce processing time, the apparatus may be configured such that, after the apparatus is started, when the head is moved by a predetermined number of tracks, the calculation is performed, and after that, the calculation for the compensation is not performed and the reference center values compensated for according to the obtained compensation-calculation results are fixed and used.

Alternatively, to reduce the amount of memory used, the apparatus may be configured such that the calculation is performed for each set of a plurality of tracks, instead of for each track, and the calculation for the compensation is performed in each set for the center value obtained from Pmax and Pmin in each set.

The coefficient "k" may be fixed in the calculation for the reference center values to be compensated for. The coefficient "k" may be set such that it is a large value until the temperature rise of the apparatus is expected to saturate in order to eliminate a DC offset generated according to the temperature rise of the apparatus, and after that, the coefficient is gradually reduced to make the apparatus unsusceptible to noise. Alternatively, the coefficient "k" may be set such that it is large until the total seek track count from the start of the apparatus exceeds a predetermined value, the coefficient "k" is reduced after that, and if a seek operation is not performed for a predetermined period of time, the coefficient "k" is set to a large value again.

According to the Pmax values and the Pmin values obtained from a plurality of tracks in a seek operation, (average of the Pmax values+average of the Pmin values)/2 may be calculated and used instead of the integrated values "a" and "b". Alternatively, instead of updating the reference center values, Pmax and Pmin may be corrected by using the integrated values "a" and "b" to eliminate the DC offset of the center values.

It is preferred that the reference center values be set and the calculation for compensating therefor be performed for both phase-A detection output and phase-B detection output. These operations may be performed only for the phase-B detection output, which is used for calculating a head positional deviation.

The compensation of the reference center values allows a head position to be detected highly precisely. In FIGS. 3A and 3B, even if the phase-A and phase-B detection outputs have a phase-difference shift of ±30 degrees against the specified phase difference of 90 degrees, the dead zone 25 is provided correspondingly to these ±30 degrees to prevent an adverse effect caused by an error of ±30 degrees. The reference center values are compensated for, as shown in FIG. 7, to prevent the phase-difference error from exceeding ±30 degrees, by the use of the offset.

What is claimed is:

1. A disk apparatus comprising:

a rotation driving section for rotating a disk;

a head facing a recording surface of the disk;

head feeding means for feeding said head in a direction in which said head traverses tracks on the disk;

head-position detection means for obtaining a detection output whose signal strength has a polarity periodically changed according to the movement of said head; and a control section for controlling said head feeding means according to the detection output obtained by said head-position detection means, wherein said control section calculates an offset between a reference center value specified in advance and the center value of the maximal value and the minimal value of the detection output detected when a seek operation, in which said head is moved to a target track, is performed; calculates a compensation value to reduce or eliminate the offset; and applies compensation control to the reference center value according to the compensation value.

2. A disk apparatus according to claim 1, wherein the detection output in the seek operation is integrated in time with the reference center value being used as a reference, and the obtained integrated value is multiplied by a coefficient to obtain the compensation value.

3. A disk apparatus according to claim 2, wherein the calculation is performed for each track or each set of a plurality of tracks, and the coefficient is specified such that the offset is reduced at a predetermined rate when said head traverses a predetermined number of tracks.

4. A disk apparatus according to claim 1, wherein the reference center value is specified for each track or for each set of a plurality of tracks which can be all tracks.

5. A disk apparatus according to claim 1, wherein the reference center value is obtained for each track or for each set of a plurality of tracks which can be all tracks, from the maximal value and the minimal value of the detection output detected when said head is moved at a lower speed than that in the seek operation, and the reference center value is stored.

6. A disk apparatus according to claim 1, wherein said control section performs track tracking control such that the reference center value corresponds to the center of the target track.

* * * * *